(12) United States Patent (10) Patent No.: US 12,698,002 B2
Jonnarth et al. (45) Date of Patent: Aug. 4, 2026

(54) OPERATION FOR A ROBOTIC WORK TOOL

(71) Applicant: HUSQVARNA AB, Huskvarna (SE)

(72) Inventors: Arvi Jonnarth, Jonkoping (SE); Georg Hagele, Oxie (SE); Jonathan Andersson, Jonkoping (SE); Kamil Mudy, Partille (SE)

(73) Assignee: HUSQVARNA AB, Huskvarna (SE)

( * ) Notice: Subject to any disclaimer, the term of this patent is extended or adjusted under 35 U.S.C. 154(b) by 135 days.

(21) Appl. No.: 18/526,939

(22) Filed: Dec. 1, 2023

(65) Prior Publication Data

US 2024/0182074 A1    Jun. 6, 2024

(30) Foreign Application Priority Data

Dec. 5, 2022    (SE) .................................... 2251417-8

(51) Int. Cl.
B60W 60/00            (2020.01)

(52) U.S. Cl.
CPC .... B60W 60/0017 (2020.02); B60W 60/0011 (2020.02); B60W 2300/15 (2013.01);
(Continued)

(58) Field of Classification Search
CPC .. A01D 34/008; A01D 2101/00; G05D 1/247;
G05D 1/248; G05D 1/246; G05D 1/249;
G05D 1/622; G05D 1/646; G05D 1/648;
G05D 1/0278; G05D 1/0274; G05D
1/027; G05D 1/0214; G05D 1/0246;

G05D 1/6484; G05D 1/0257; G05D
1/245; G05D 1/024; G05D 1/0236; G05D
1/693; G05D 1/80; G05D 2111/10; G05D
2111/17;
(Continued)

(56) References Cited

U.S. PATENT DOCUMENTS 8,666,550 B2 *  3/2014  Anderson ............ A01D 34/008
                                                    700/255
10,466,707 B2 * 11/2019  Taylor .................. G05D 1/0214
(Continued)

FOREIGN PATENT DOCUMENTS

CN          114616972 A      6/2022
EP          3989033 A1       4/2022
(Continued)

OTHER PUBLICATIONS

Swedish Office Action and Search Report for Swedish Application No. 2251417-8, Mailed on Jun. 26, 2023.

*Primary Examiner* — Ramon A. Mercado
*Assistant Examiner* — Noah W Stiebritz
(74) *Attorney, Agent, or Firm* — Burr & Forman

(57)            ABSTRACT
A robotic work tool system (200) comprising a robotic work tool (100) arranged to operate in an operational area (205) wherein the robotic work tool comprises an obstacle sensor (185) and a controller (110) configured to receive (410) sensor input from the obstacle sensor (185), detect (415) an obstacle (H) and determine (420) a dimension (W) of the obstacle (H), determine (425) whether the dimension exceeds a threshold size, and if so circumvent (430) the obstacle (H) while maintaining a safety distance (D) to the obstacle (H), determine (435) that there is a human behind the obstacle (H) and if so take (440) evasive action.

20 Claims, 4 Drawing Sheets

(52) U.S. Cl.
CPC ............... *B60W 2554/4029* (2020.02); *B60W 2554/4041* (2020.02)

(58) Field of Classification Search
CPC ............ G05D 2111/30; G05D 2111/36; G05D 2111/60; G05D 2107/23; B60W 60/0017; B60W 60/0011; B60W 2300/15; B60W 2554/4029; B60W 2554/4041; B60W 2554/00; B60W 2556/50
See application file for complete search history.

(56) References Cited

U.S. PATENT DOCUMENTS

| | | | |
|---|---|---|---|
| 11,330,948 B2 * | 5/2022 | Noh | A47L 11/4011 |
| 11,927,965 B2 * | 3/2024 | Ebrahimi Afrouzi | |
| | | | G06F 3/04845 |
| 12,282,330 B2 * | 4/2025 | Korjus | B60Q 1/5035 |
| 2014/0222197 A1 | 8/2014 | Letsky | |
| 2016/0188977 A1 * | 6/2016 | Kearns | B25J 11/002 |
| | | | 348/113 |
| 2019/0357431 A1 * | 11/2019 | Kamfors | G05D 1/0214 |
| 2020/0042009 A1 | 2/2020 | Yang et al. | |
| 2022/0066456 A1 | 3/2022 | Ebrahimi et al. | |

FOREIGN PATENT DOCUMENTS

| | | | |
|---|---|---|---|
| SE | 1951412 A1 | 6/2021 | |
| WO | 2022120713 A1 | 6/2022 | |

* cited by examiner

410
RECEIVE SENSOR INPUT

415
DETERMINE OBSTACLE

420
DETERMINE DIMENSION

425
DETERMINE
DIMENSION EXCEEDS THRESHOLD

430
CIRCUMVENT AT DISTANCE

435
DETERMINE
HUMAN BEHIND OBSTACLE

440
TAKE EVASIVE ACTION

530

100

100

520

500

510

OPERATION FOR A ROBOTIC WORK TOOL

TECHNICAL FIELD

This application relates to a robotic work tool, such as a lawnmower, and a method for providing an improved operation of a robotic work tool as regards operating in an area where humans or animals roam.

BACKGROUND

Automated or robotic work tools such as robotic lawnmowers are becoming increasingly more popular and so is the use of the robotic work tool in various types of operational areas, such as gardens, parks, sports fields, airfields and so on. Such operational areas, in particular for robotic work tools being robotic lawnmowers, are often visited by humans or animals, and in such areas the robotic work tool can both be a nuisance to humans or animals and potentially also pose a risk of injury even if only a small risk, at least as perceived by humans. Especially where large robotic work tools are used, humans or animals may be startled if a robotic work tool comes close to them or if they accidentally come upon one, almost walking in to one.

Thus, there is a need for an improved manner of providing a manner of operation that does not startle humans or animals.

SUMMARY

It is therefore an object of the teachings of this application to overcome or at least reduce those problems by providing a robotic work tool system comprising a robotic work tool arranged to operate in an operational area wherein the robotic work tool comprises an obstacle sensor and a controller configured to receive sensor input from the obstacle sensor, detect an obstacle and determine a dimension of the obstacle, determine whether the dimension exceeds a threshold size, and if so circumvent the obstacle while maintaining a safety distance to the obstacle, determine that there is a human behind the obstacle and if so take evasive action.

It is also an object of the teachings of this application to overcome or at least reduce those problems by providing a method for use in a robotic work tool system comprising a robotic work tool arranged to operate in an operational area, wherein the method comprises receiving sensor input from the obstacle sensor, detecting an obstacle and determining a dimension of the obstacle, determining whether the dimension exceeds a threshold size, and if so circumventing the obstacle while maintaining a safety distance to the obstacle, determining that there is a human behind the obstacle and if so taking evasive action.

It is also an object of the teachings of this application to overcome the problems by providing a computer-readable medium carrying computer instructions that when loaded into and executed by a controller of a robotic work tool enables the robotic work tool to implement the method according to herein.

Further embodiments and aspects are as in the attached patent claims and as discussed in the detailed description.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein. Like reference numbers refer to like elements throughout.

It should be noted that even though the description given herein will be focused on robotic lawnmowers, the teachings herein may also be applied to, robotic ball collectors, robotic mine sweepers, robotic farming equipment, or other robotic work tools.

Figure 1A:
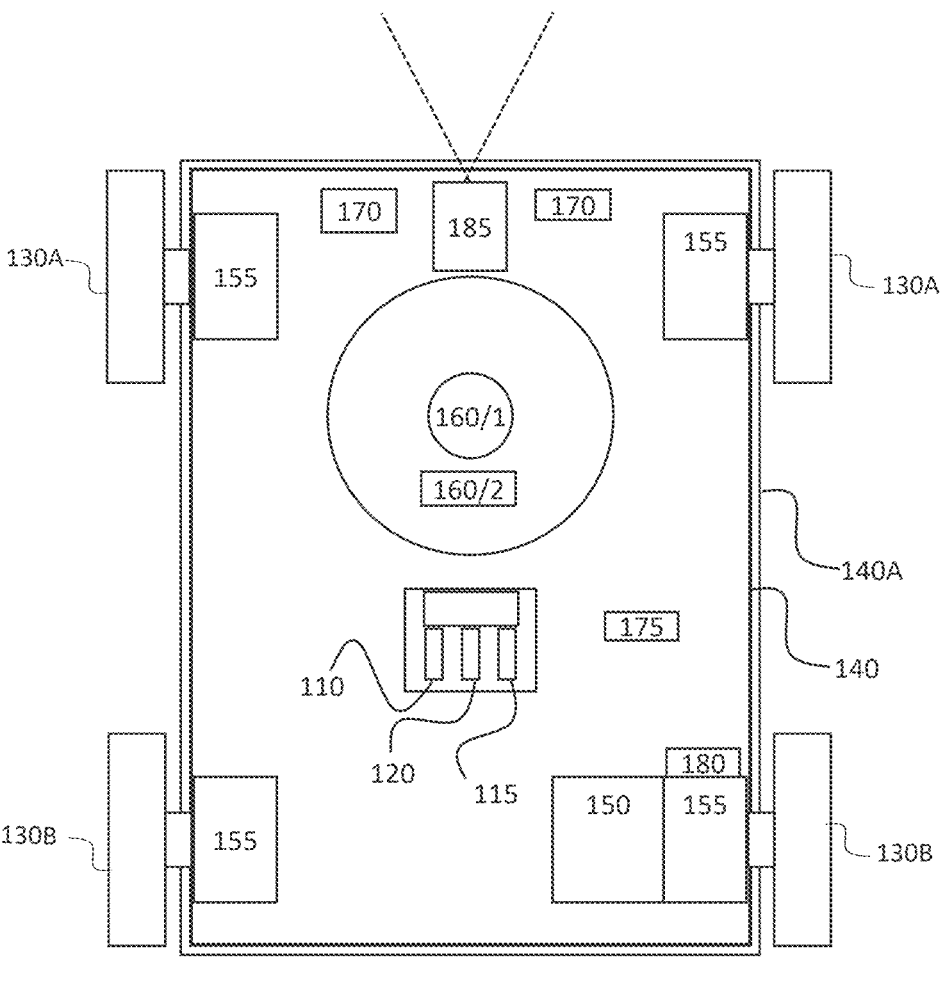
FIG. 1A shows a schematic view of the components of an example of a robotic work tool being a robotic lawnmower according to some example embodiments of the teachings herein.

FIG. 1A shows a schematic overview of a robotic work tool 100, here exemplified by a robotic lawnmower 100. The robotic work tool 100 may be a multi-chassis type or a mono-chassis type (as in FIG. 1A). A multi-chassis type comprises more than one main body parts that are movable with respect to one another. A mono-chassis type comprises only one main body part.

It should be noted that robotic lawnmower may be of different sizes, where the size ranges from merely a few decimetres for small garden robots, to even more than 2 meters for large robots arranged to service for example airfields.

It should be noted that even though the description herein is focused on the example of a robotic lawnmower, the teachings may equally be applied to other types of robotic work tools, such as robotic watering tools, robotic golf ball collectors, robotic fertilizers and robotic mulchers to mention a few examples.

In some embodiments, and as will be discussed below, the robotic work tool is a semi-controlled or at least supervised autonomous work tool, such as farming equipment or large lawnmowers, for example riders or comprising tractors being autonomously controlled.

It should also be noted that the robotic work tool is a self-propelled robotic work tool, capable of autonomous navigation within an operational area, where the robotic work tool propels itself across or around the operational area in a pattern (random or predetermined).

The robotic work tool 100, exemplified as a robotic lawnmower 100, has a main body part 140, possibly comprising a chassis 140 and an outer shell 140A, and a plurality of wheels 130A and 130B (in this example four wheels 130A and 130B, but other number of wheels are also possible, such as three or six).

The main body part 140 substantially houses all components of the robotic lawnmower 100. At least some of the wheels 130A and 130B are drivably connected to at least one electric motor 155 powered by a battery 150. It should be noted that even if the description herein is focused on electric motors, combustion engines may alternatively be used, possibly in combination with an electric motor. In the example of FIG. 1, each of the wheels 130A and 130B is connected to a common or to a respective electric motor 155 for driving the wheels 130A and 130B to navigate the robotic lawnmower 100 in different manners. The wheels, the motor 155 and possibly the battery 150 are thus examples of components making up a propulsion device. By controlling the motors 155, the propulsion device may be controlled to propel the robotic lawnmower 100 in a desired manner, and the propulsion device will therefore be seen as synonymous with the motor(s) 150. It should be noted that wheels 130A and 130B driven by electric motors is only one example of a propulsion system and other variants are possible such as caterpillar tracks.

The robotic lawnmower 100 also comprises a controller 110 and a computer readable storage medium or memory 120. The controller 110 may be implemented using instructions that enable hardware functionality, for example, by using executable computer program instructions in a general-purpose or special-purpose processor that may be stored on the memory 120 to be executed by such a processor. The controller 110 is configured to read instructions from the memory 120 and execute these instructions to control the operation of the robotic lawnmower 100 including, but not being limited to, the propulsion and navigation of the robotic lawnmower.

The controller 110 in combination with the electric motor 155 and the wheels 130A and 130B forms the base of a navigation system (possibly comprising further components) for the robotic lawnmower, enabling it to be self-propelled as discussed.

The controller 110 may be implemented using any suitable, available processor or Programmable Logic Circuit (PLC). The memory 120 may be implemented using any commonly known technology for computer-readable memories such as ROM, FLASH, DDR, or some other memory technology.

The robotic lawnmower 100 is further arranged with a wireless communication interface 115 for communicating with other devices, such as a server, a personal computer, a smartphone, the charging station, and/or other robotic work tools. Examples of such wireless communication devices are Bluetooth®, WiFi® (IEEE802.11b), Global System Mobile (GSM) and LTE (Long Term Evolution), to name a few. The robotic lawnmower 100 may be arranged to communicate with a user equipment (not shown but will be regarded as being an example of a server, as an example of a connected device) as discussed in relation to FIG. 2 below for providing information regarding status, location, and progress of operation to the user equipment as well as receiving commands or settings from the user equipment. Alternatively or additionally, the robotic lawnmower 100 may be arranged to communicate with a server (referenced 240 in FIG. 2) for providing information regarding status, location, and progress of operation as well as receiving commands or settings. Especially the server may be arranged to provide map information or other information on a work area such as information on the boundary.

The robotic lawnmower 100 also comprises a work tool 160, which in the example of the robotic lawnmower 100 is a grass cutting device 160, such as a rotating blade 160/2 driven by a cutter motor 160/1. In embodiments where the robotic work tool 100 is exemplified as an automatic grinder, the work tool 160 is a rotating grinding disc.

For enabling the robotic lawnmower 100 to navigate with reference to a wire, such as a boundary wire or a guide wire, emitting a magnetic field caused by a control signal transmitted through the wire, the robotic lawnmower 100 is, in some embodiments, configured to have at least one magnetic field sensor 170 arranged to detect the magnetic field and for detecting the wire and/or for receiving (and possibly also sending) information to/from a signal generator. In some embodiments, such a magnetic boundary is used to provide a border (not shown explicitly in FIG. 2, but deemed to be included in the boundary 220) enclosing an operational area (referenced 205 in FIG. 2).

In some embodiments the robotic lawnmower 100 comprises a satellite signal navigation sensor 175 configured to provide navigational information (such as position) based on receiving one or more signals from a satellite—possibly in combination with receiving a signal from a base station. In some embodiments the satellite navigation sensor is a GPS (Global Positioning System) device or other Global Navigation Satellite System (GNSS) device. In some embodiments the satellite navigation sensor 175 is a RTK sensor. This enables the robotic work tool to operate in an operational area bounded by a virtual border (not shown explicitly in FIG. 2 but deemed to be included in the boundary 220).

The robotic lawnmower 100 also comprises deduced reckoning sensors 180. The deduced reckoning sensors may be odometers, accelerometers or other deduced reckoning sensors. In some embodiments the deduced reckoning sensors 180 include visual sensors, such as for Simultaneous Localization And Mapping, SLAM, navigation or other visual navigation. In such embodiments the boundary may be bounded by reference objects (not shown explicitly in FIG. 2 but deemed to be included in the boundary 220).

In some embodiments, the deduced reckoning sensors are comprised in the propulsion device, wherein a deduced reckoning navigation may be provided by knowing the current supplied to a motor and the time the current is supplied, which will give an indication of the speed and thereby distance for the corresponding wheel.

The deduced reckoning sensors 180, especially in combination with the visual odometry sensor, enables the root to operate according to a map of the operational area. In some such embodiments, the navigation is based on SLAM, and in some embodiments, where a visual odometry sensor (such as a camera) is utilized, the navigation is based on V-SLAM.

The robotic lawnmower 100 is in some embodiments arranged to operate according to a map application (indicated in FIG. 2 and referenced 120A) representing one or more operational areas (and possibly the surroundings of the operational area(s)) as well as features of the operational area(s) stored in the memory 120 of the robotic lawnmower 100. In some embodiments, the map is also or alternatively stored in the memory of a server (referenced 240 in FIG. 2). The map application may be generated or supplemented as the robotic lawnmower 100 operates or otherwise moves around in the operational area. In some embodiments, the map application is downloaded, possibly from the server. In some embodiments, the map application also includes one or more transport areas. The robotic lawnmower 100 is arranged to navigate according to the map based on the deduced reckoning sensors 180 and/or the satellite navigation sensor 175.

The robotic work tool also comprises one or more obstacle sensors 185. In some embodiments the obstacle sensors 185 include an image sensor, such as a camera, whereby an object may be detected by the controller (or a controller of the obstacle sensor) performing image analysis on a captured image. In some embodiments the obstacle sensors 185 include a radar sensor, whereby an object may be detected by the controller (or a controller of the obstacle sensor) performing analysis on received radar data. In some embodiments the obstacle sensors 185 include a laser sensor, such as a Lidar sensor, whereby an object may be detected by the controller (or a controller of the obstacle sensor) performing analysis on received laser data. In some embodiments the obstacle sensors 185 include or are comprised in the satellite navigation sensor 175 and/or the deduced reckoning sensor 180, whereby an object may be detected by the controller comparing a determined position for the robotic work tool 100 to a map application in which the location and dimensions of obstacles are stored.

In some embodiments the robotic lawnmower is arranged or configured to traverse and operate in operational areas that are not essentially flat, but contain terrain that is of varying altitude, such as undulating, comprising hills or slopes or such. The ground of such terrain is not flat and it is not straightforward how to determine an angle between a sensor mounted on the robotic lawnmower and the ground. The robotic lawnmower is also or alternatively arranged or configured to traverse and operate in an operational area that contains obstacles that are not easily discerned from the ground. Examples of such are grass or moss-covered rocks, roots or other obstacles that are close to ground and of a similar colour or texture as the ground. The robotic lawnmower is also or alternatively arranged or configured to traverse and operate in an operational area that contains obstacles that are overhanging, i.e. obstacles that may not be detectable from the ground up, such as low hanging branches of trees or bushes. Such a garden is thus not simply a flat lawn to be mowed or similar, but an operational area of unpredictable structure and characteristics. The operational area exemplified with referenced to FIG. 2, may thus be such a non-uniform operational area as disclosed in this paragraph that the robotic lawnmower is arranged to traverse and/or operate in.

Figure 1B:
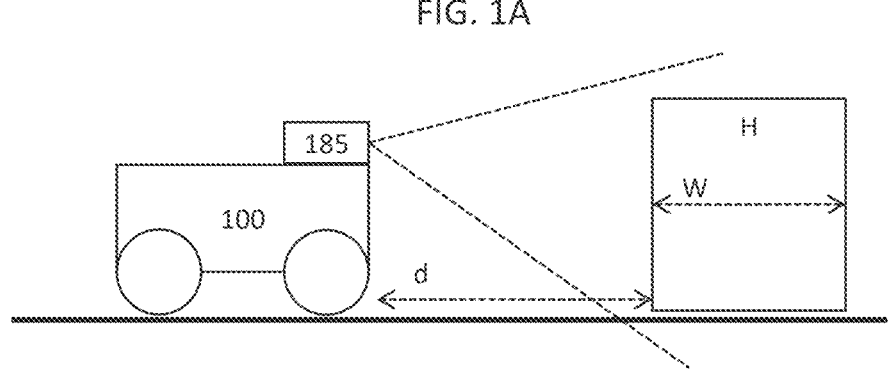
FIG. 1B shows a schematic side-view of an example of a robotic work tool operating on a surface encountering an obstacle.

FIG. 1B shows a situation where the robotic lawnmower 100 is navigating a surface of an operational area and detecting an obstacle, such as a house (referenced H), utilizing the obstacle sensor 185. The obstacle sensor 185 is not only configured to detect the obstacle H, but also to determine a distance d to the obstacle H and a dimension of the obstacle H. The dimension of the obstacle includes a width W of the obstacle H. In some embodiments the dimension W also includes a height. Based on the received sensor data from the obstacle sensor 185, the robotic work tool 100 will thus be able to detect an obstacle, determine a distance to the obstacle, and also determine whether the dimensions W of the obstacle exceeds a threshold size. The threshold size relates to a threshold width, and in some embodiments, the threshold size also relates to a height. The threshold size is set to be large enough so that a human or animal can be obscured by the obstacle H. Or phrased differently, the threshold size is large enough so that the obstacle will hide the robotic work tool from sight for the human or animal. In some embodiments the threshold sizes may be set to be large enough to hide a human. In some embodiments the threshold sizes may be set to be large enough to hide an animal and then depends on what animals are frequently seen in the area, for example, dogs, deers and/or bears.

In some embodiments the threshold size is set to be 1, 2, 3, 4 or 5 meters wide or any range there-in-between such as 1-5 meters. In some embodiments the threshold size is set to be 1, 1.5 or 2 meters high or any range there-in-between such as 1-2 meters.

Figure 2:
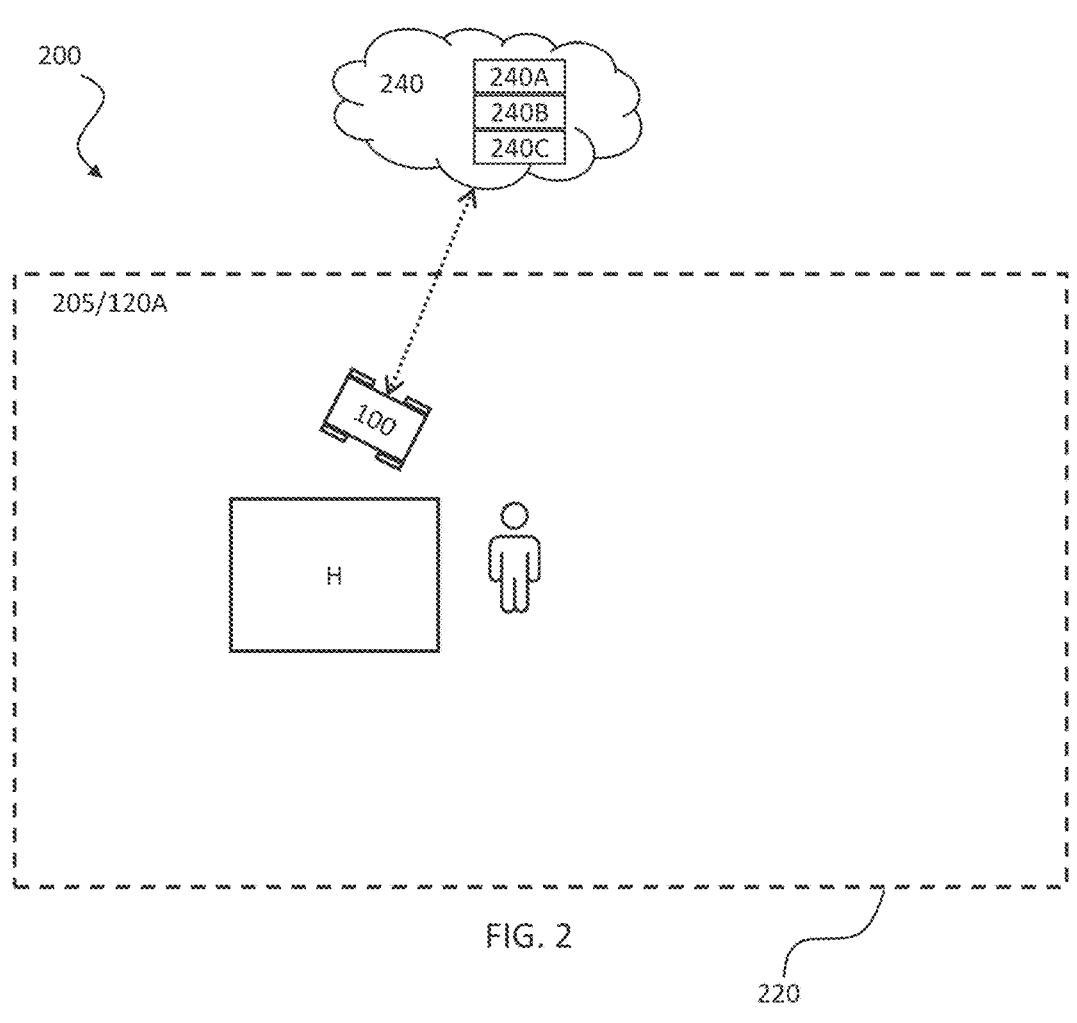
FIG. 2 shows a schematic view of a robotic work tool system according to some example embodiments of the teachings herein.

FIG. 2 shows a robotic lawnmower system 200 in some embodiments. The schematic view is not to scale. The robotic lawnmower system 200 comprises one or more robotic lawnmowers 100 according to the teachings herein arranged to operate in one or more operational areas 205 possibly bounded by a boundary 220. It should be noted that the operational area 205 shown in FIG. 2 is simplified for illustrative purposes.

The view of the operational area 205 is also intended to be an illustration or graphical representation of the map application 120A discussed in the above.

A server 240 is shown as an optional connected device for the robotic lawnmower 100 to communicate with—possibly for receiving maps or map updates. The server 240 comprises a controller 240A for controlling the operation of the server 240, a memory 240B for storing instructions and data relating to the operation of the server 240 and a communication interface 240C for enabling the server 240 to communicate with other entities, such as the robotic lawnmower 100, and/or a User Equipment such as a mobile phone. The controller, the memory and the communication interface may be of similar types as discussed in relation to FIG. 1 for the robotic lawnmower 100.

The server 240 may be a cloud service, a dedicated service provider server, or an application running in a local personal computer, a tablet computer or a smart phone. For the reasons of this application it should be noted that there will be made no difference between the types of servers, but the description will focus on a server being implemented in an application for execution in a user equipment such as a smartphone, a personal computer, or a tablet computer.

As is shown in FIG. 2 there may be obstacles such as houses, structures, trees to mention a few examples in the operational area 205. In FIG. 2 such obstacles are indicated and referenced H (as in house).

As is illustrated in FIG. 2 a human being on one side of the house may be startled as the human (or the robotic work tool 100) rounds a corner and is faced with the other at a close distance.

The inventors have realized a brilliantly simple, yet highly effective solution in that a robotic work tool 100 approaching an obstacle that is large enough to obscure or hide a human (or animal) is configured to keep a distance from the obstacle until it has determined that there is no human (or animal) being hidden or obscured by the obstacle.

Figure 3A:
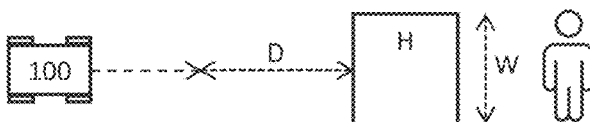
FIGS. 3A to 3D each shows a schematic view of a robotic work tool according to some example embodiments of the teachings herein.

FIG. 3A shows an example of a robotic work tool 100 approaching an obstacle H. The robotic work tool 100 detects the obstacle H and determines the dimensions of the obstacle H. As noted in relation to FIG. 1A this detection can be done in many ways depending on what type of obstacle sensor 185 is being utilized, be it a camera, a radar, a lidar or a map application or any combination of some or all of these examples.

If the obstacle H is determined to be of a dimension exceeding the threshold size, the robotic work tool 100 will not approach closer than a safety distance D to the obstacle H, but will move to the side of the obstacle H in an attempt to circumvent the obstacle, as in finding a way around the obstacle.

In some embodiments the circumventing of the obstacle H is done as part of the normal planned operation and may thus require many navigational operations until the robotic work tool 100 happens to be in a position to a side of the obstacle H where the obstacle sensor can see behind the obstacle.

In some embodiments the circumventing of the obstacle H is done as a targeted movement to circumvent the obstacle H. In some embodiments, the circumvention is done by a movement to the side. In some embodiments, the circumvention is done by a keeping at a minimum distance of the safety distance, such as by following a contour of the obstacle. In some embodiments, the circumvention is done by a circling the obstacle H.

Figure 3B:
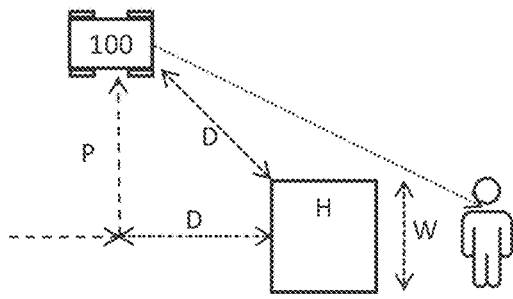

FIG. 3B shows a schematic view of how the robotic work tool 100 in this example has circumvented the obstacle H by moving to a side of the obstacle H while keeping to the minimum safety distance D. As the robotic work tool 100 has circumvented the obstacle H and regains a view behind the obstacle H, the robotic work tool 100 is able to detect whether there is a human (or animal) behind the obstacle or not.

The human (or animal) is in some embodiments detected utilizing the obstacle sensor 185. For obstacle sensors 185 relying on comparing positions to a map application, the server 240 may provide information on whether a (tracked) human—such as an operator—is behind the obstacle or not.

If there is no human (or animal) the robotic work tool 100 may continue operating in the visible area (the area where the obstacle sensor—or other sensor—can detect that there is no human or animal).

If there is a human (or animal) the robotic work tool 100 takes evasive action. In some embodiments, the evasive action includes moving back to the side where the obstacle was approached and continue operating there. In some embodiments, the evasive action includes stopping and deactivating the work tool 160. In some such embodiments, the robotic work tool 100 is configured to stop until it is detected that the human (or animal) is no longer visible (or otherwise detectable). In some such alternative or additional embodiments, the robotic work tool 100 is configured to stop for a predetermined time (for example 10, 20, 30, 60, 90 or 120 seconds) after which it is assumed that the human (or animal) will no longer be startled by the robotic work tool 100.

In some embodiments, the evasive action includes operating in another part of the operational area 205 and return at a later time, such as the end of a schedule work event or at another scheduled work event.

In some embodiments the safety distance depends on the size of animal, whereby the safety distance is 2×, 5× or 10× the (average) size of the animal.

In some embodiments the safety distance depends on the width of the obstacle, whereby the safety distance is 0.5×, 1× or 2× the width of the obstacle.

In some embodiments the safety distance depends on the size of the robotic work tool, whereby the safety distance is 5×, 10×, or 20× the size of the robotic work tool.

In some embodiments the safety distance depends on the size of the work tool of the robotic work tool, whereby the safety distance is 10×, 20×, or 50× the size of the work tool 160 of the robotic work tool.

In some embodiments the safety distance depends on the speed of the robotic work tool, whereby the safety distance is a distance travelled by the robotic work tool in 10, 20, 30 or 60 seconds at the speed of the robotic work tool.

In some embodiments the safety distance depends on the rotational speed of the work tool 160 of the robotic work tool, whereby the safety distance is 10 m for rotational speeds under 4000 rpms and 20 m for rotational speeds above 4000 rpms.

In some embodiments a minimum safety distance is 10, 15 or 20 meters, or any range there-in-between such as 10-20, meters irrespective of how the safety distance is set.

Figure 3C:
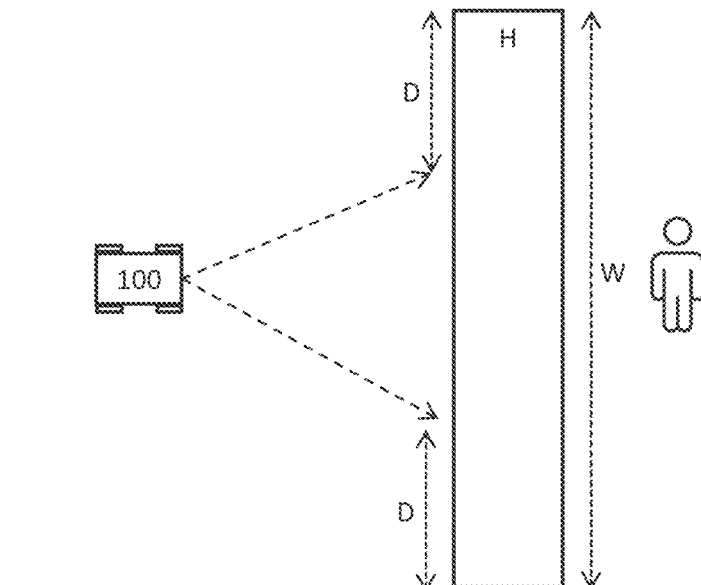

FIG. 3C shows an example where the obstacle His big. The obstacle is determined to be very big when the width of the obstacle exceeds a second threshold size. In some embodiments the second threshold size is set dependent on the safety distance D. In some such embodiments the second threshold size is set as 1×, 1.5× or 2× the safety distance D or any range there-in-between such as 1-2× the safety distance.

If it is determined that the obstacle is big (has a width exceeding the second threshold), the robotic work tool 100 is enabled to approach the obstacle H at distances shorter than the safety distance, but not to a corner or other edge of the obstacle, to which the safety distance must be kept. As long as the safety distance to an edge or corner of the obstacle is maintained there is no risk of surprising or startling a human or animal and the robotic work tool 100 may operate by the obstacle H as is shown in FIG. 3C.

Figure 3D:
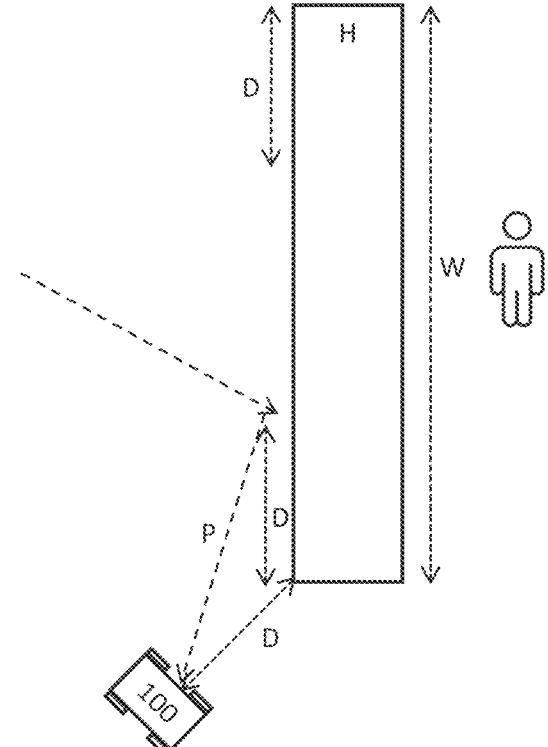

However, as the robotic work tool 100 intends to round a corner or other edge of the obstacle H, the robotic work tool 100 must maintain the safety distance D, which may mean that the robotic work tool again moves away from the obstacle, as is shown in FIG. 3D.

The corner or edge of the obstacle may be determined as the visible edge of the obstacle H. As would be understood a round obstacle will not have an edge or corner, but will have an edge at which the line of vision is blocked. This edge will then be determined to be the edge of the obstacle H.

Figure 4:
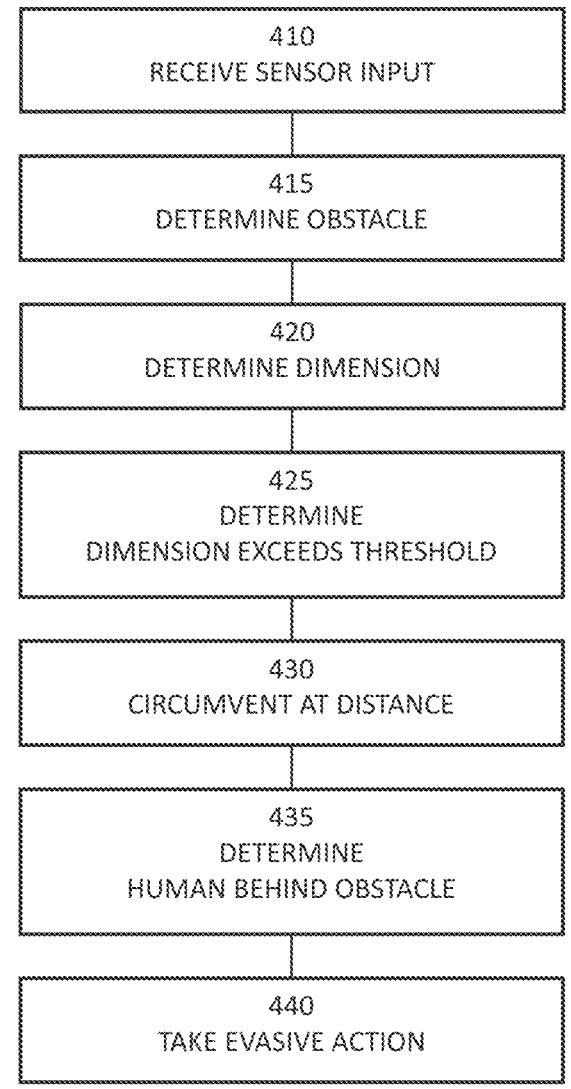
FIG. 4 shows a corresponding flowchart for a method according to some example embodiments of the teachings herein.

FIG. 4 shows a flowchart for a general method according to herein. The method is for use in a robotic work tool as in FIG. 1A in a manner as discussed above in relation to FIGS. 1B, 2, 3A, 3B, 3C and 3D, namely for use in a robotic work tool system comprising a robotic work tool 100 arranged to operate in an operational area 205 where humans (or animals) may roam.

The method comprises a controller 110 of the robotic lawnmower 100 receiving 410 input from an obstacle sensor 185 and detecting 415 an obstacle H. The robotic work tool also determines 420 a dimension W of the obstacle H and determines 425 whether the dimension exceeds a threshold size. If the dimension of the obstacle H exceeds the threshold size, the robotic work tool 100 circumvents 430 the obstacle H while maintaining a safety distance D to the obstacle H, or at least to an edge of the obstacle H as discussed above. The safety distance D is maintained until the robotic work tool 100 determines 435 whether there is a human (or animal) behind the obstacle—or at least an edge of the obstacle H—or not. If there is a human, the robotic work tool 100 takes 440 evasive action, and if not the robotic work tool 100 continues operating.

Figure 5:
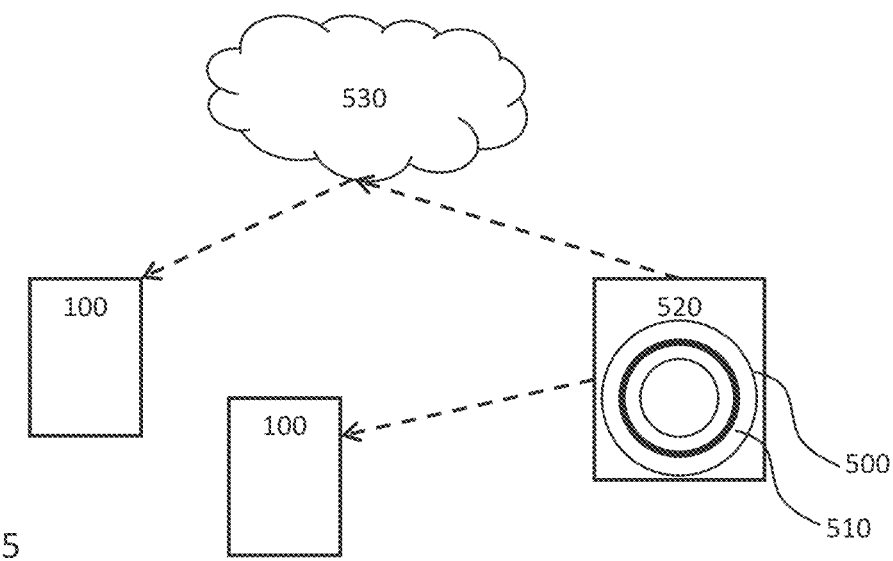
FIG. 5 shows a schematic view of a computer-readable medium carrying computer instructions that when loaded into and executed by a controller of a robotic work tool, enables the robotic work tool to implement the teachings herein.

FIG. 5 shows a schematic view of a computer-readable medium 500 carrying computer instructions 510 that when loaded into and executed by a controller of a robotic work tool 100 enables the robotic work tool 100 to implement the teachings herein. The computer-readable medium 500 may be tangible such as a hard drive or a flash memory, for example a USB memory stick or a cloud server. Alternatively, the computer-readable medium 500 may be intangible such as a signal carrying the computer instructions enabling the computer instructions to be downloaded through a network connection, such as an internet connection. In the example of FIG. 5, a computer-readable medium 500 is shown as being a hard drive or computer disc 500 carrying computer-readable computer instructions 510, being inserted in a computer disc reader 520. The computer disc reader 520 may be part of a cloud server 530—or other server—or the computer disc reader 520 may be connected to a cloud server 530—or other server. The cloud server 530 may be part of the internet or at least connected to the internet. The cloud server 530 may alternatively be connected through a proprietary or dedicated connection. In one example embodiment, the computer instructions are stored at a remote server 530 and be downloaded to the memory 120 of the robotic work tool 100 for being executed by the controller 110.

The computer disc reader 520 may also or alternatively be connected to (or possibly inserted into) a robotic work tool 100 for transferring the computer-readable computer instructions 510 to a controller of the robotic work tool 100 (presumably via a memory of the robotic work tool 100).

FIG. 5 shows both the situation when a robotic work tool 100 receives the computer-readable computer instructions 510 via a server connection and the situation when another robotic work tool 100 receives the computer-readable computer instructions 510 through a wired interface. This enables for computer-readable computer instructions 510 being downloaded into a robotic work tool 100 thereby enabling the robotic work tool 100 to operate according to and implement the invention as disclosed herein.

The invention claimed is:

1. A robotic work tool system comprising a robotic work tool arranged to operate in an operational area wherein the robotic work tool comprises an obstacle sensor and a controller configured to:

receive sensor input from the obstacle sensor, detect an obstacle and determine a dimension of the obstacle, determine whether the dimension exceeds a threshold size large enough to obstruct a view of a human on an opposite side of the obstacle relative to the robotic work tool, and if so circumvent the obstacle while maintaining a safety distance to the obstacle such that the robotic work tool does not approach the obstacle at a distance shorter than the safety distance prior to a view of the opposite side of the obstacle being obtained by the robotic work tool, determine whether the human is behind the obstacle, and take evasive action in response to determining the human is behind the obstacle and operate in an area in which the view is obtained in response to determining the human is not behind the obstacle.

2. The robotic work tool system according to claim 1, wherein the controller is further configured to determine that there is no human behind the obstacle and if so continue operating.

3. The robotic work tool system according to claim 1, wherein the controller is further configured to determine whether there is an animal behind the obstacle.

4. The robotic work tool system according to claim 1, wherein the robotic work tool is configured to maintain the safety distance to the obstacle by maintaining the safety distance to an edge of the obstacle.

5. The robotic work tool system according to claim 1, wherein the robotic work tool is configured to determine that the dimension of the obstacle exceeds a second threshold and in response thereto approach the obstacle at distances shorter than the safety distance but maintain the safety distance to an edge of the obstacle.

6. The robotic work tool system according to claim 1, wherein the robotic work tool is configured to circumvent the obstacle as part of planned operation, by a movement to a side of the robotic work tool, following a contour of the obstacle, or by circling the obstacle.

7. The robotic work tool system according to claim 1, wherein the evasive action includes moving back to a side from which the obstacle was approached and continue operating on the side from which the obstacle was approached.

8. The robotic work tool system according to claim 1, wherein evasive action includes stopping and deactivating a work tool, stopping until it is detected that the human is no longer detectable, or operating in another part of the operational area and return at a later time.

9. The robotic work tool system according to claim 8, wherein the robotic work tool is configured to stop for a predetermined time.

10. The robotic work tool system according to claim 1, wherein the obstacle sensor includes an image sensor and wherein the controller is configured to detect the obstacle by the controller performing image analysis on a captured image.

11. The robotic work tool system according to claim 1, wherein the obstacle sensor includes a radar sensor or a laser sensor and wherein the controller is configured to detect the obstacle by the controller performing analysis on received radar data or laser data.

12. The robotic work tool system according to claim 1, wherein the obstacle sensor is comprised in a satellite navigation sensor and/or a deduced reckoning sensor, wherein the controller is configured to detect the obstacle by the controller comparing a determined position for the robotic work tool to a map application in which the location and dimensions of obstacles are stored.

13. The robotic work tool system according to claim 1, wherein the safety distance depends on the width of the obstacle.

14. The robotic work tool system according to claim 1, wherein the safety distance depends on the size of the robotic work tool or on a size of a work tool of the robotic work tool.

15. The robotic work tool system according to claim 1, wherein the safety distance depends on the speed of the robotic work tool.

16. The robotic work tool system according to claim 1, wherein the safety distance depends on the rotational speed of a work tool of the robotic work tool.

17. The robotic work tool system according to claim 1, wherein the safety distance is in a range between 10-20 meters.

18. The robotic work tool system according to claim 1, wherein the robotic work tool is a robotic lawnmower.

19. A method for use in a robotic work tool system comprising a robotic work tool arranged to operate in an operational area, wherein the method comprises:

receiving sensor input from the obstacle sensor, detecting an obstacle and determine a dimension of the obstacle, determining whether the dimension exceeds a threshold size large enough to obstruct a view of a human on an opposite side of the obstacle relative to the robotic work tool, and if so circumventing the obstacle while maintaining a safety distance to the obstacle such that the robotic work tool does not approach the obstacle at a distance shorter than the safety distance prior to a view of the opposite side of the obstacle is being obtained by the robotic work tool, determining whether the human is behind the obstacle, and taking evasive action in response to determining the human is behind the obstacle and operate in an area in which the view is obtained in response to determining the human is not behind the obstacle.

20. A non-transitory computer-readable medium carrying computer instructions that when loaded into and executed by a controller of a robotic work tool enables the robotic work tool to implement the method according to claim 19.

\* \* \* \* \*